United States Patent
Kim et al.

(10) Patent No.: US 10,230,516 B2
(45) Date of Patent: Mar. 12, 2019

(54) METHOD AND APPARATUS FOR TRANSMITTING AND RECEIVING FEEDBACK INFORMATION IN WIRELESS ACCESS SYSTEM SUPPORTING FDR TRANSMISSION

(71) Applicant: LG ELECTRONICS INC., Seoul (KR)

(72) Inventors: Jinmin Kim, Seoul (KR); Jaehoon Chung, Seoul (KR); Genebeck Hahn, Seoul (KR); Eunjong Lee, Seoul (KR); Kukheon Choi, Seoul (KR); Kwangseok Noh, Seoul (KR)

(73) Assignee: LG Electronics Inc., Seoul (KR)

(*) Notice: Subject to any disclaimer, the term of this patent is extended or adjusted under 35 U.S.C. 154(b) by 134 days.

(21) Appl. No.: 15/308,748

(22) PCT Filed: May 18, 2015

(86) PCT No.: PCT/KR2015/004954
§ 371 (c)(1),
(2) Date: Nov. 3, 2016

(87) PCT Pub. No.: WO2015/178640
PCT Pub. Date: Nov. 26, 2015

(65) Prior Publication Data
US 2017/0187508 A1    Jun. 29, 2017

Related U.S. Application Data

(60) Provisional application No. 61/994,973, filed on May 18, 2014.

(51) Int. Cl.
*H04W 72/04* (2009.01)
*H04L 5/14* (2006.01)
(Continued)

(52) U.S. Cl.
CPC .............. *H04L 5/0092* (2013.01); *H04L 5/14* (2013.01); *H04L 5/1469* (2013.01);
(Continued)

(58) Field of Classification Search
CPC .... H04W 72/042; H04W 72/0446; H04L 5/14
See application file for complete search history.

(56) References Cited

U.S. PATENT DOCUMENTS 8,953,505 B2 * 2/2015 Chun .................... H04L 1/1887
                                                            370/280
2011/0267995 A1 * 11/2011 Li ......................... H04L 1/1614
                                                            370/280

(Continued)

FOREIGN PATENT DOCUMENTS

| KR | 1020090078731 A | 7/2009 |
| WO | 2013002562 A2 | 1/2013 |
| WO | 2013100475 A1 | 7/2013 |

*Primary Examiner* — Hoon J Chung
(74) *Attorney, Agent, or Firm* — Dentons US LLP

(57) ABSTRACT

The present invention relates to a wireless access system supporting a full duplex radio (FDR) transmission environment. A method for receiving feedback information by a base station in a wireless access system supporting FDR comprises the steps of: transmitting, to a terminal, frame configuration information of terminal-specific time division multiplexing (TDD); and receiving, from the terminal, feedback information in an uplink (UL) subframe according to the frame configuration information, wherein the frame configuration information can determine the location of the UL subframe in which feedback information for each DL subframe is to be transmitted, on the basis of the value obtained by dividing the number of downlink (DL) subframes by the number of UL subframes in a wireless frame.

12 Claims, 20 Drawing Sheets

(51) Int. Cl.
*H04L 5/00* (2006.01)
*H04L 27/26* (2006.01)

(52) U.S. Cl.
CPC ....... *H04L 27/2646* (2013.01); *H04W 72/042* (2013.01); *H04W 72/0446* (2013.01); *H04L 5/001* (2013.01); *H04L 5/0023* (2013.01)

(56) References Cited

U.S. PATENT DOCUMENTS

| | | | |
|---|---|---|---|
| 2012/0230232 A1* | 9/2012 | Ji | H04B 7/2656 370/280 |
| 2013/0194980 A1 | 8/2013 | Yin et al. | |
| 2014/0086112 A1 | 3/2014 | Stern-Berkowitz et al. | |
| 2015/0188687 A1* | 7/2015 | Gao | H04L 1/1607 370/278 |

* cited by examiner (a)

(b)

before ADC after ADC after digital
cancellation
and scaling

FIG. 19

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | ing and receiving feedback information when FDR is applied and an apparatus supporting the same.

METHOD AND APPARATUS FOR TRANSMITTING AND RECEIVING FEEDBACK INFORMATION IN WIRELESS ACCESS SYSTEM SUPPORTING FDR TRANSMISSION

This is application is a National Stage Entry of International Application No. PCT/KR2015/004954 filed May 18, 2015, which claims priority to U.S. Provisional Application No. 61/994,973 filed May 18, 2014, each of which are incorporated by reference for all purposes as if fully set forth herein.

TECHNICAL FIELD

The present invention relates to a wireless access system supporting a Full Duplex Radio (FDR) transmission environment, and more particularly, to a method for efficiently transmitting and receiving feedback information when FDR is applied and an apparatus supporting the same.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide methods for efficiently transmitting and receiving a signal in a wireless access system supporting FDR transmission.

Another object of the present invention is to provide an apparatus supporting the above methods.

The technical objects that can be achieved through the present invention are not limited to what has been particularly described hereinabove and other technical objects not described herein will be more clearly understood by persons skilled in the art from the following detailed description.

Technical Solution

According to one embodiment of the present invention devised to solve the above problems, a method for receiving feedback information in an eNB of a wireless access system supporting FDR (full duplex radio) comprises the steps of transmitting, to a UE, frame configuration information of UE-specific time division multiplexing (TDD); and receiving, from the UE, feedback information at an uplink (UL) subframe according to the frame configuration information, wherein the frame configuration information determines a position of the UL subframe, to which feedback information for each DL subframe is to be transmitted, on the basis of a value obtained by dividing the number of downlink (DL) subframes by the number of UL subframes within a radio frame.

If the value obtained by dividing the number of DL subframes by the number of UL subframes is an integer 'x', the frame configuration information may be configured to sequentially transmit feedback information of x number of DL subframes at the Nth (N is an integer) UL subframe and transmit feedback information of next x number of DL subframes at the (N+1)th UL subframe.

If the value obtained by dividing the number of DL subframes by the number of UL subframes exceeds 1, and when a quotient obtained by dividing the number of DL subframes by the number of UL subframes is an integer 'L' and the remainder is an integer 'M', the frame configuration information may be configured to repeat sequential transmission of feedback information of (L+1) number of DL subframes at the Nth (N is an integer) UL subframe M times and transmit feedback information of next L number of DL subframes at the (N+M+1)th UL subframe.

If the value obtained by dividing the number of DL subframes by the number of UL subframes is 1 or less, the frame configuration information may be configured to transmit feedback information of one DL subframe at one UL subframe.

The frame configuration information may be configured based on restrictions that a first subframe is the DL subframe, a second subframe is a special subframe, a third subframe is allocated to the UL subframe, and the UL subframe is continuously allocated.

The feedback information may be transmitted at a UL subframe after 4 ms from a DL subframe corresponding to the feedback information.

The frame configuration information may be configured by assuming a special subframe as a DL subframe when the number of DL subframes is divided by the number of UL subframes.

According to another embodiment of the present invention, an eNB for receiving feedback information in a wireless access system supporting FDR (full duplex radio), the eNB comprises radio frequency (RF) units; and a processor, wherein the processor is configured to transmit, to a UE, frame configuration information of UE-specific time division multiplexing (TDD) and receive, from the UE, feedback information at an uplink (UL) subframe according to the frame configuration information, and wherein the frame configuration information determines a position of the UL subframe, to which feedback information for each DL subframe is to be transmitted, on the basis of a value obtained by dividing the number of downlink (DL) subframes by the number of UL subframes within a radio frame.

If the value obtained by dividing the number of DL subframes by the number of UL subframes is an integer 'x', the frame configuration information may be configured to sequentially transmit feedback information of x number of DL subframes at the Nth (N is an integer) UL subframe and transmit feedback information of next x number of DL subframes at the (N+1)th UL subframe.

If the value obtained by dividing the number of DL subframes by the number of UL subframes exceeds 1, and when a quotient obtained by dividing the number of DL subframes by the number of UL subframes is an integer 'L' and the remainder is an integer 'M', the frame configuration information may be configured to repeat sequential transmission of feedback information of (L+1) number of DL subframes at the Nth (N is an integer) UL subframe M times and transmit feedback information of next L number of DL subframes at the (N+M+1)th UL subframe.

If the value obtained by dividing the number of DL subframes by the number of UL subframes is 1 or less, the frame configuration information may be configured to transmit feedback information of one DL subframe at one UL subframe.

The frame configuration information may be configured based on restrictions that a first subframe is the DL subframe, a second subframe is a special subframe, a third subframe is allocated to the UL subframe, and the UL subframe is continuously allocated.

The feedback information may be transmitted at a UL subframe after 4 ms from a DL subframe corresponding to the feedback information.

The frame configuration information may be configured by assuming a special subframe as a DL subframe when the number of DL subframes is divided by the number of UL subframes.

Advantageous Effects

According to the embodiments of the present invention, the following effects can be obtained.

First, feedback information can be efficiently transmitted and received in a wireless access system supporting FDR transmission.

Effects according to the present invention are not limited to what has been particularly described hereinabove and other advantages not described herein will be more clearly understood by persons skilled in the art from the following detailed description of the present invention. That is, unintended effects of the present invention may also be derived by those skilled in the art from the embodiments of the present invention.

BRIEF DESCRIPTION OF THE DRAWINGS

FIG. 19 illustrates an example of frame configuration in a radio frame structure of FIG. 18(b).

BEST MODE FOR CARRYING OUT THE INVENTION

Figure 1:
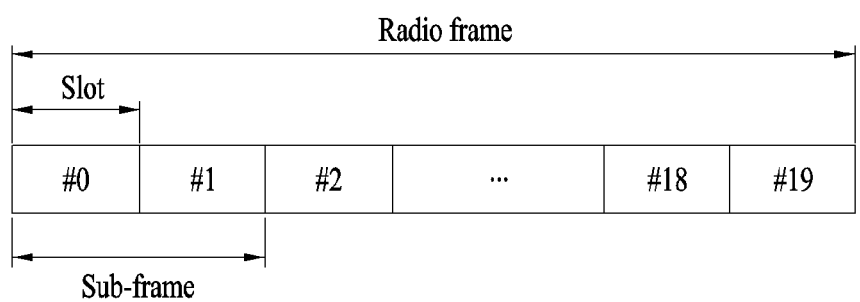
FIG. 1 illustrates an example of a structure of a downlink radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1 is a diagram illustrating the structure of the type 1 radio frame. A downlink radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or symbol duration. An RB is a resource allocation unit including a plurality of contiguous subcarriers in one slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce interference between symbols.

In case of a normal CP, since one slot includes seven OFDM symbols, one subframe includes 14 DM symbols. The first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in a radio frame, the number of slots included in a subframe or the number of symbols included in a slot may be changed in various manners.

Figure 2:
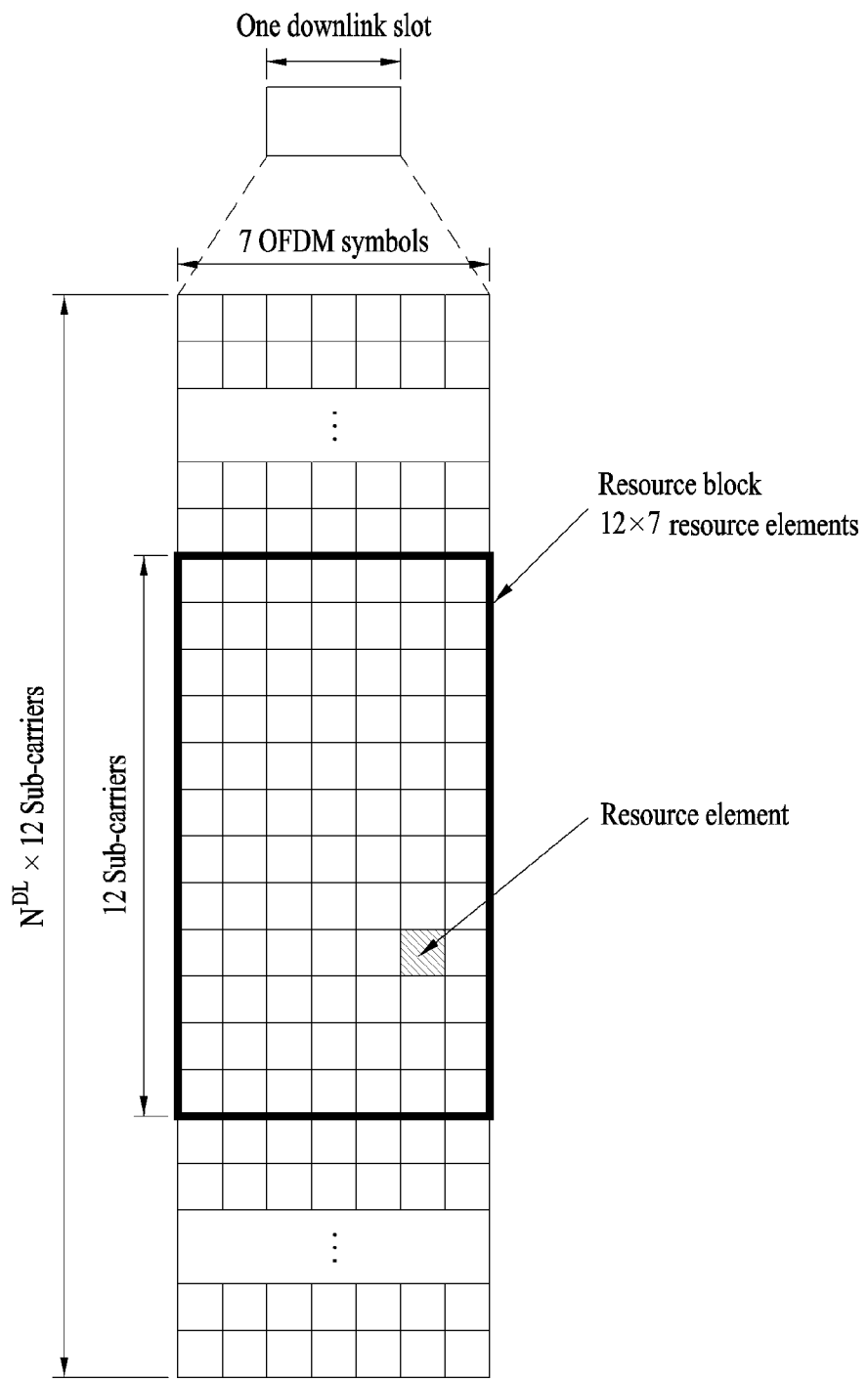
FIG. 2 illustrates an example of a resource grid for one downlink slot.

FIG. 2 is a diagram illustrating an example of a resource grid in one downlink slot. OFDM symbols are configured by the normal CP. Referring to FIG. 2, the downlink slot includes a plurality of OFDM symbols in the time domain and includes a plurality of RBs in the frequency domain. Although FIG. 2 exemplarily depicts that one downlink slot includes seven OFDM symbols and one RB includes 12 subcarriers, the present invention is not limited thereto. Each element of the resource grid is referred to as a Resource Element (RE). For example, an RE a(k,l) is located at a kth subcarrier and an lth OFDM symbol. In case of a normal CP, one RB includes 12·7 REs (in case of an extended CP, one RB includes 12·6 REs). Since the spacing between subcarriers is 15 kHz, one RB is about 180 kHz in the frequency domain. NDL denotes the number of RBs included in the downlink slot. NDL is determined based on a downlink transmission bandwidth set through Node B scheduling.

Figure 3:
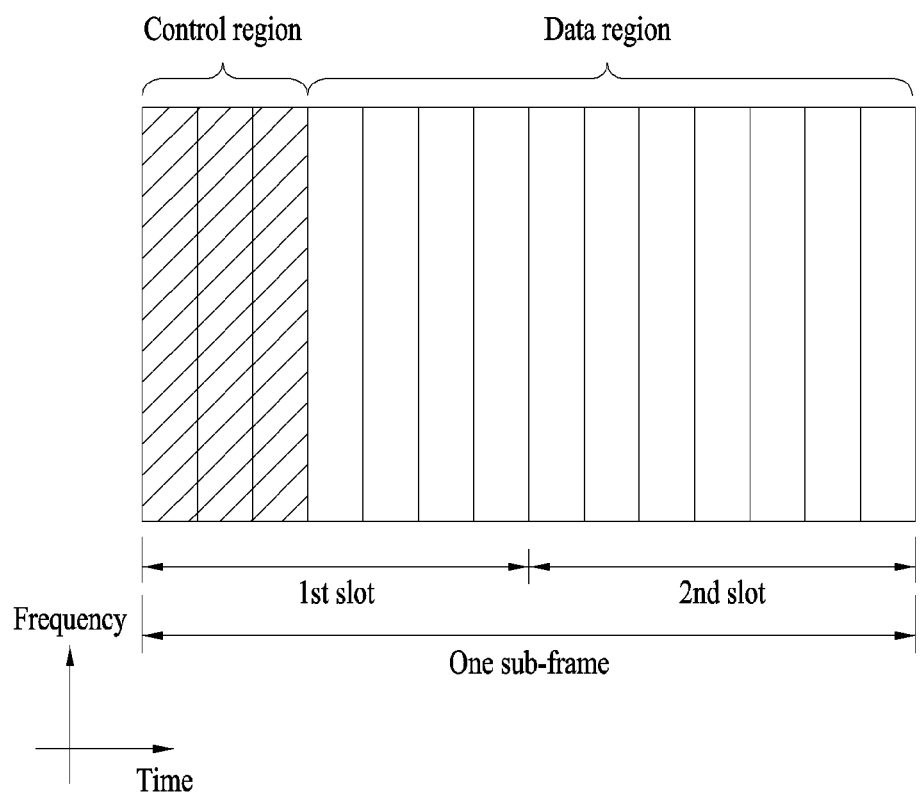
FIG. 3 is a diagram illustrating a structure of a downlink subframe.

FIG. 3 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. A basic transmission unit is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

Figure 4:
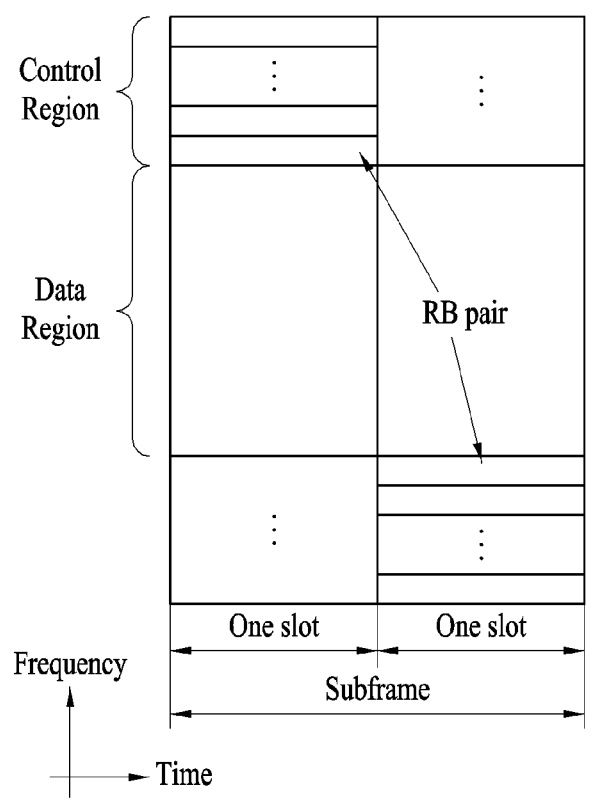
FIG. 4 is a diagram illustrating a structure of an uplink subframe.

FIG. 4 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multiple Input Multiple Output (MIMO) System

The MIMO system increases data transmission/reception efficiency using a plurality of Tx antennas and a plurality of Rx antennas. MIMO is an application of putting data segments received from a plurality of antennas into a whole message, without depending on a single antenna path to receive the whole message.

MIMO schemes are classified into spatial diversity and spatial multiplexing. Spatial diversity increases transmission reliability or a cell radius using diversity gain and thus is suitable for data transmission for a fast moving UE. In spatial multiplexing, multiple Tx antennas simultaneously transmit different data and thus high-speed data can be transmitted without increasing a system bandwidth.

Figure 5:
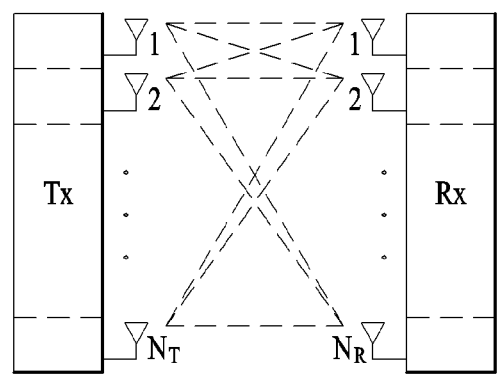
FIG. 5 is a schematic diagram illustrating a wireless communication system supporting multiple antennas.
Figure 5:
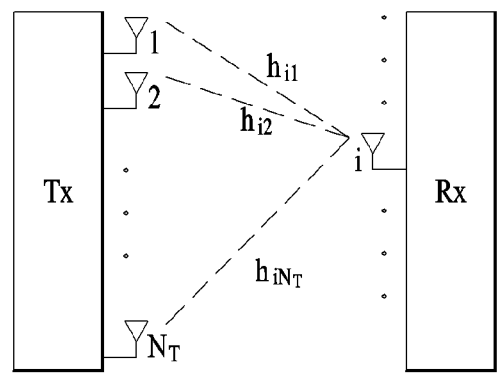

FIG. 5 illustrates the configuration of a wireless communication system supporting multiple antennas. Referring to FIG. 5(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas will be described in detail through mathematical modeling.

Regarding a transmission signal, up to NT pieces of information can be transmitted through the NT Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots s_{N_T}$. Let the transmit power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ denotes a weight between a jth piece of information and an ith Tx antenna and W is a precoding matrix.

The transmitted signal x may be differently processed using according to two schemes (for example, spatial diversity and spatial multiplexing). In spatial multiplexing, different signals are multiplexed and transmitted to a receiver such that elements of information vector(s) have different values. In spatial diversity, the same signal is repeatedly transmitted through a plurality of channel paths such that elements of information vector(s) have the same value. Spatial multiplexing and spatial diversity may be used in combination. For example, the same signal may be transmitted through three Tx antennas in spatial diversity, while the remaining signals may be transmitted to the receiver in spatial multiplexing.

Given NR Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished according to the indexes of Tx and Rx antennas. A channel between a jth Tx antenna and an ith Rx antenna is denoted by hij. Notably, the index of an Rx antenna precedes the index of a Tx antenna in hij.

FIG. 5(b) illustrates channels from NT Tx antennas to an ith Rx antenna. The channels may be collectively represented as a vector or a matrix. Referring to FIG. 5(b), the channels from the NT Tx antennas to the ith Rx antenna may be expressed as $$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN added to the NR Rx antennas is given as the following vector.

$$n = [n_1, n_2, \ldots, n_{N_R}]^T \quad \text{[Equation 9]}$$

From the above mathematical modeling, the received signal vector is given $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns in the channel matrix H representing channel states are determined according to the numbers of Rx and Tx antennas. Specifically, the number of rows in the channel matrix H is equal to the number of Rx antennas, NR and the number of columns in the channel matrix H is equal to the number of Tx antennas, NT. Hence, the channel matrix H is of size NR×NT.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

In MIMO transmission, the term "rank" denotes the number of paths for independently transmitting signals, and the term "number of layers" denotes the number of signal streams transmitted through respective paths. In general, since a transmitter transmits as many layers as the number of ranks used for signal transmission, the rank has the same meaning as the number of layers unless otherwise noted.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
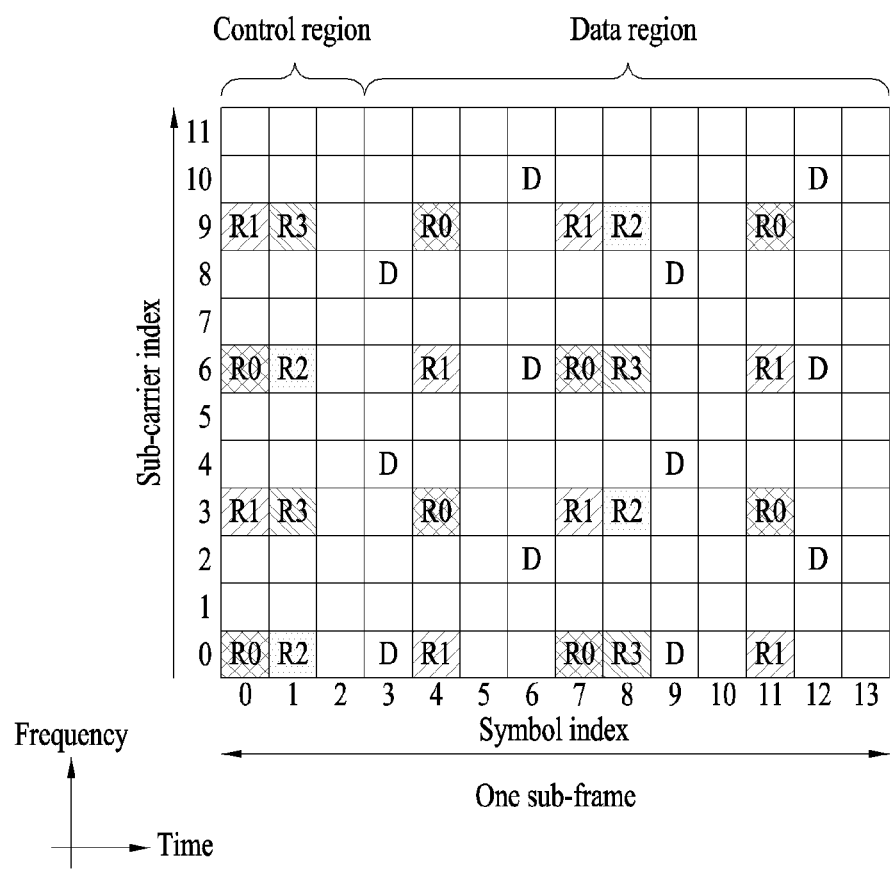
FIG. 6 is a diagram illustrating an example of CRS and DRS patterns for one resource block.

FIG. 6 illustrates CRS and DRS patterns for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a Modulation and Coding Scheme (MCS), a Precoding Matrix Index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted on a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
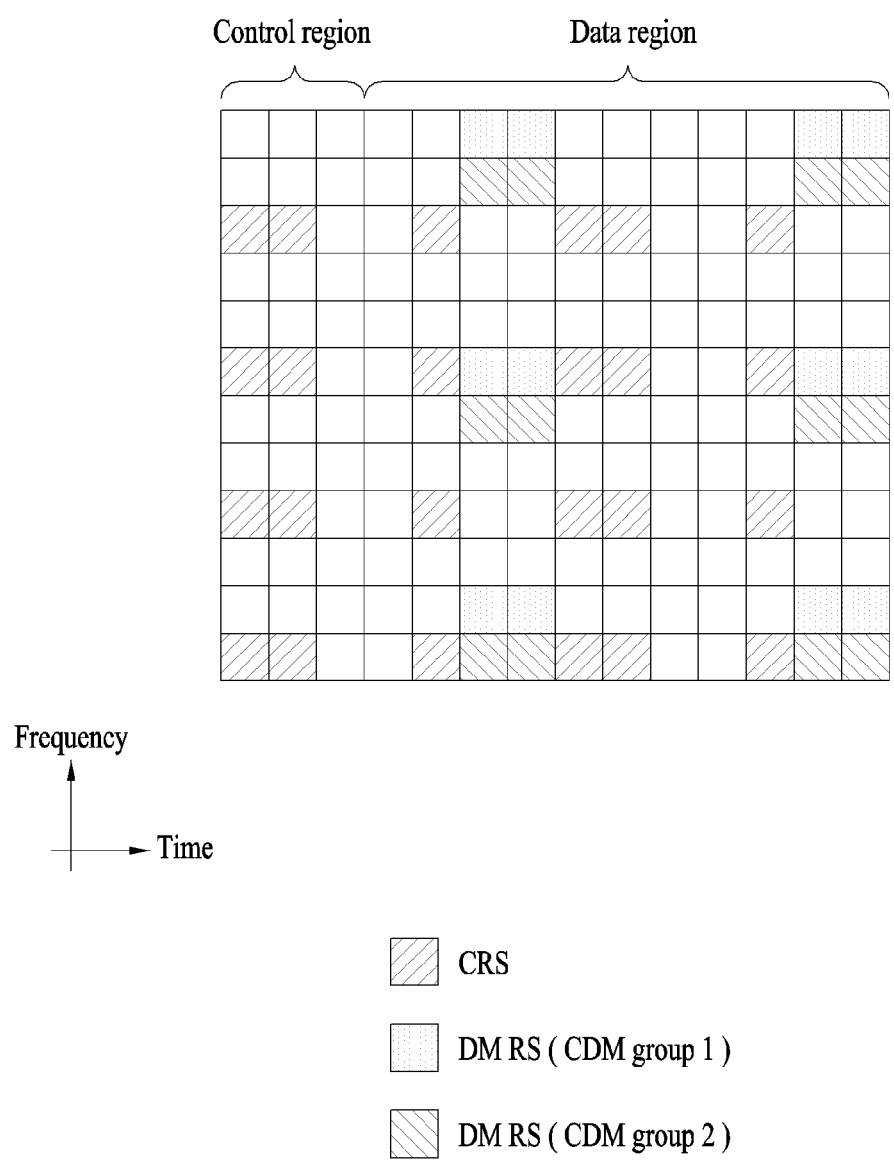
FIG. 7 is a diagram illustrating an exemplary DM RS pattern defined in an LTE-A system.

FIG. 7 illustrates an exemplary DM RS pattern defined in the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in Frequency Division Multiplexing (FDM) and/or Time Division Multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
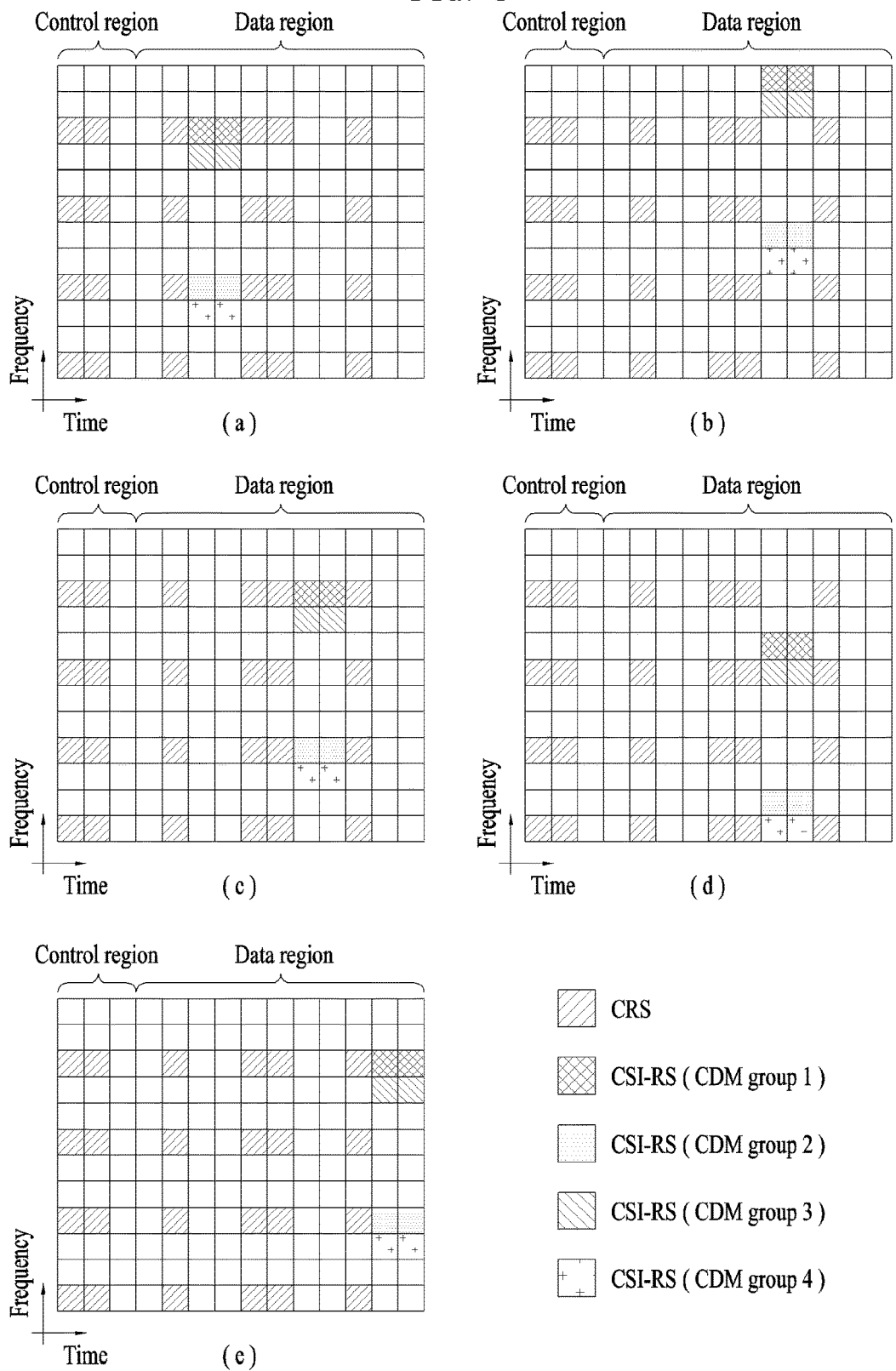
FIG. 8 is a diagram illustrating exemplary CSI-RS patterns defined in an LTE-A system.

FIG. 8 illustrates exemplary CSI-RS patterns defined in the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(*a*) to 8(*e*) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(*a*), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(*a*) is applicable to the CSI-RS patterns illustrated in FIGS. 8(*b*) to 8(*e*).

Figure 9:
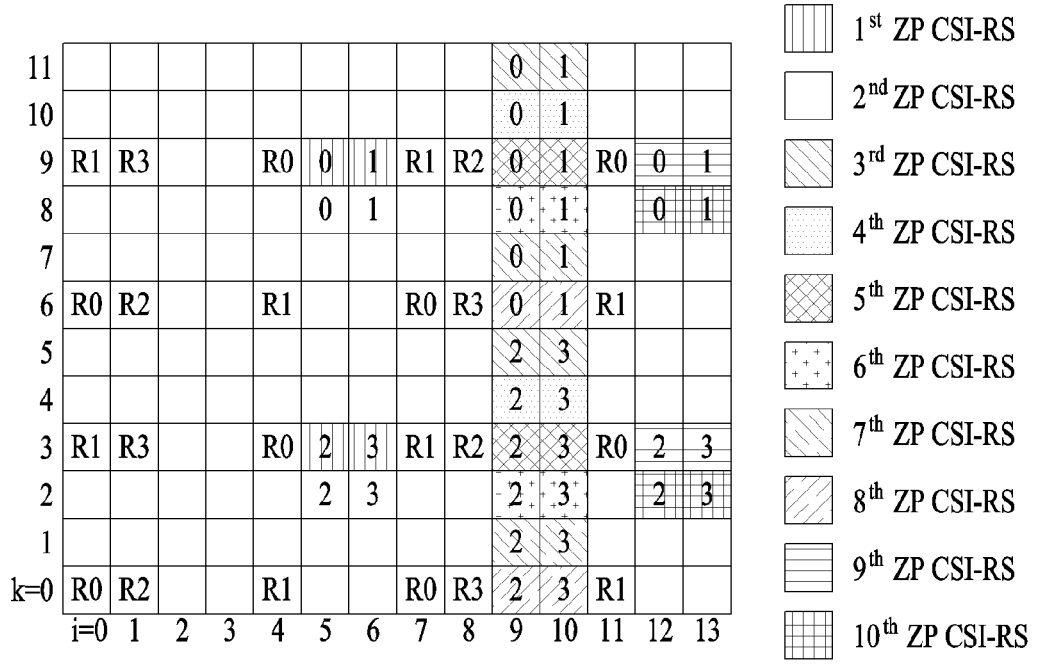
FIG. 9 is a diagram illustrating an exemplary Zero-Power (ZP) CSI-RS pattern defined in an LTE-A system.

FIG. 9 is a diagram illustrating an exemplary Zero-Power (ZP) CSI-RS pattern defined in the LTE-A system. A ZP CSI-RS is largely used for two purposes. First, the ZP CSI-RS is used to improve CSI-RS performance That is, one network may mute a CSI-RS RE of another network in order to improve CSI-RS measurement performance of the other network and inform a UE thereof of the muted RE by setting the muted RE to a ZP CSI-RS so that the UE may correctly perform rate matching. Second, the ZP CSI-RS is used for interference measurement for CoMP CQI calculation. That is, some networks may mute a ZP CRS-RS RE and a UE may calculate a CoMP CQI by measuring interference from the ZP CSI-RS.

The RS patterns of FIGS. 6 to 9 are purely exemplary and an RS pattern applied to various embodiments of the present invention is not limited to such specific RS patterns. In other words, even when an RS pattern different from the RS patterns of FIGS. 6 to 9 is defined and used, various embodiments of the present invention may be identically applied.

Full Duplex Radio (FDR) Transmission

FDR refers to transmission and reception technology in which an eNB and/or a UE support transmission without separately performing uplink/downlink duplexing in frequency/time, etc.

Figure 10:
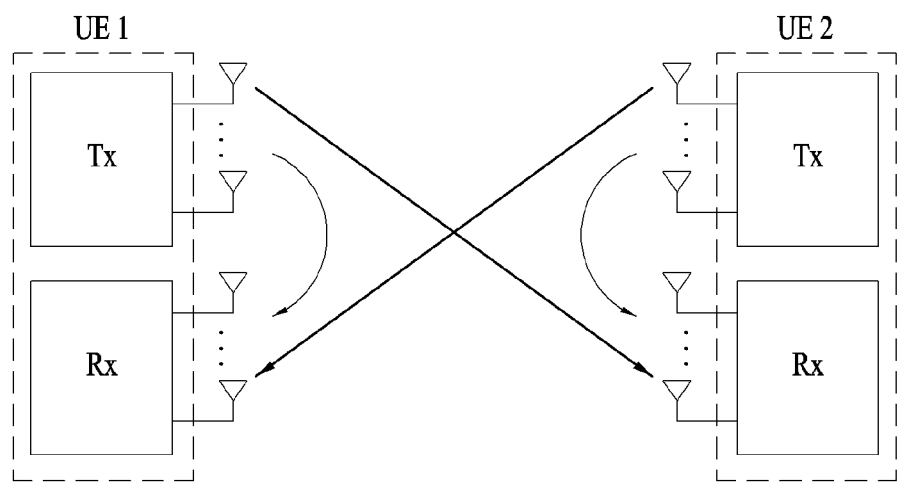
FIG. 10 is a diagram illustrating an exemplary interference situation in an FDR scheme.

FIG. 10 is a diagram illustrating an exemplary interference situation in an FDR scheme.

Referring to FIG. 10, UE 1 and UE 2 perform communication on uplink/downlink using the same frequency/time resource. Accordingly, each UE may perform transmission and simultaneously receive a signal from another eNB or UE. That is, as illustrated in dotted lines of FIG. 10, a communication environment in which a transmission signal of a device is received by a reception module (or a receiver) of the device to directly cause self-interference is formed.

When a multi-cell deployment environment is considered in a system, new interference or increased interference, which is expected due to introduction of FDR, is summarized as follows.

(1) Self-interference (Intra-device self-interference)

(2) Multi-user interference (UE to UE inter-link interference)

(3) Inter-cell interference (BS to BS inter-link interference)

Self-interference indicates that a signal transmitted from a device directly causes interference with respect to a receiver of the device as illustrated in FIG. Generally, a self-interference signal is received with a higher power than a desired signal. Therefore, it is important to perfectly cancel self-interference through an interference cancellation operation.

Second, multi-user interference refers to interference occurring between UEs. For example, multi-user interference indicates that a signal transmitted by a UE is received by an adjacently located UE, thereby acting as interference. In a legacy communication system, since a half-duplex mode (e.g., FDD or TDD) in which uplink or downlink transmission is separately performed in frequency or time is implemented, interference does not occur between uplink and downlink. However, an FDR transmission environment in which uplink and downlink share the same frequency/time resource causes interference between an eNB that transmits data and adjacent UEs as illustrated in FIG. 10.

Lastly, inter-cell interference represents interference occurring between eNBs. For example, inter-cell interference indicates that a signal transmitted by one eNB in a heterogeneous eNB situation is received by a receiving antenna of another eNB, thereby acting as interference. This interference represents the same communication situation as multi-user interference and occurs by sharing uplink and downlink resources between eNBs. That is, although FDR can increase frequency efficiency by sharing the same time/frequency resources in uplink and downlink, increased interference may restrict frequency efficiency improvement.

Among the above three types of interference, (1) self-interference should be solved first for FDR operation due to an effect of interference occurring only in FDR. FIG. 10 shows exemplary FDR in a self-interference situation. In more detail, a signal transmitted from one UE is received by a receiving antenna of the same UE, thereby acting as interference.

Such self-interference has unique characteristics as opposed to other interference.

First, a signal serving as interference may be regarded as a perfectly known cable signal by implementation on hardware. However, although a signal received from an antenna is almost the same as a signal received through a cable, these signals are not the same as each other as much as 100% due to non-linearity of RF device, channel change of an interference signal between transmitting and receiving antennas, etc. Therefore, even though the signal serving as interference is perfectly known by the receiver, the receiver cannot cancel interference perfectly.

Figure 11:
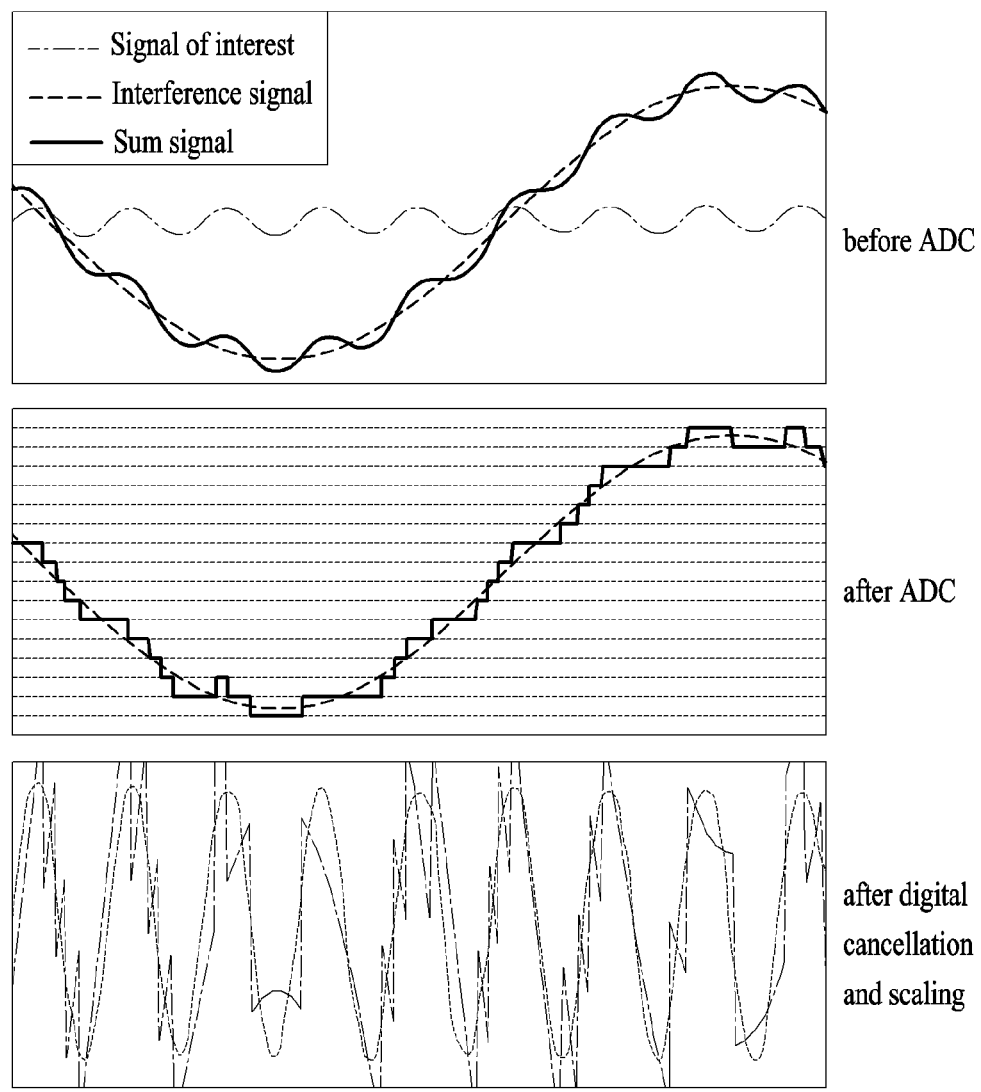
FIG. 11 is a diagram illustrating an example of signal distortion in a state that an interference signal has a power much higher than that of a desired signal.

Second, power of a signal serving as interference is considerably higher than power of a desired signal. Accordingly, even if a signal serving as interference is perfectly known, a receiver cannot perfectly cancel interference. The receiver uses an Analog-to-Digital Converter (ADC) to convert a received signal into a digital signal. Generally, the ADC measures power of a received signal to adjust a power level of the received signal, quantizes the power-adjusted received signal, and converts the quantized signal into a digital signal. However, if an interference signal is received at a remarkably higher power relative to a desired signal, characteristics of the desired signal are covered by a quantization level during quantization and thus the received signal may not be restored. FIG. 11 is a diagram illustrating distortion of a desired signal even after cancellation of an interference signal when quantization is performed in a state that power of the interference signal is much higher than power of the desired signal and FIG. 12 is a diagram illustrating restoration of a desired signal after an interference signal is cancelled when power of the interference signal is lower than power of the desired signal.

Figure 12:
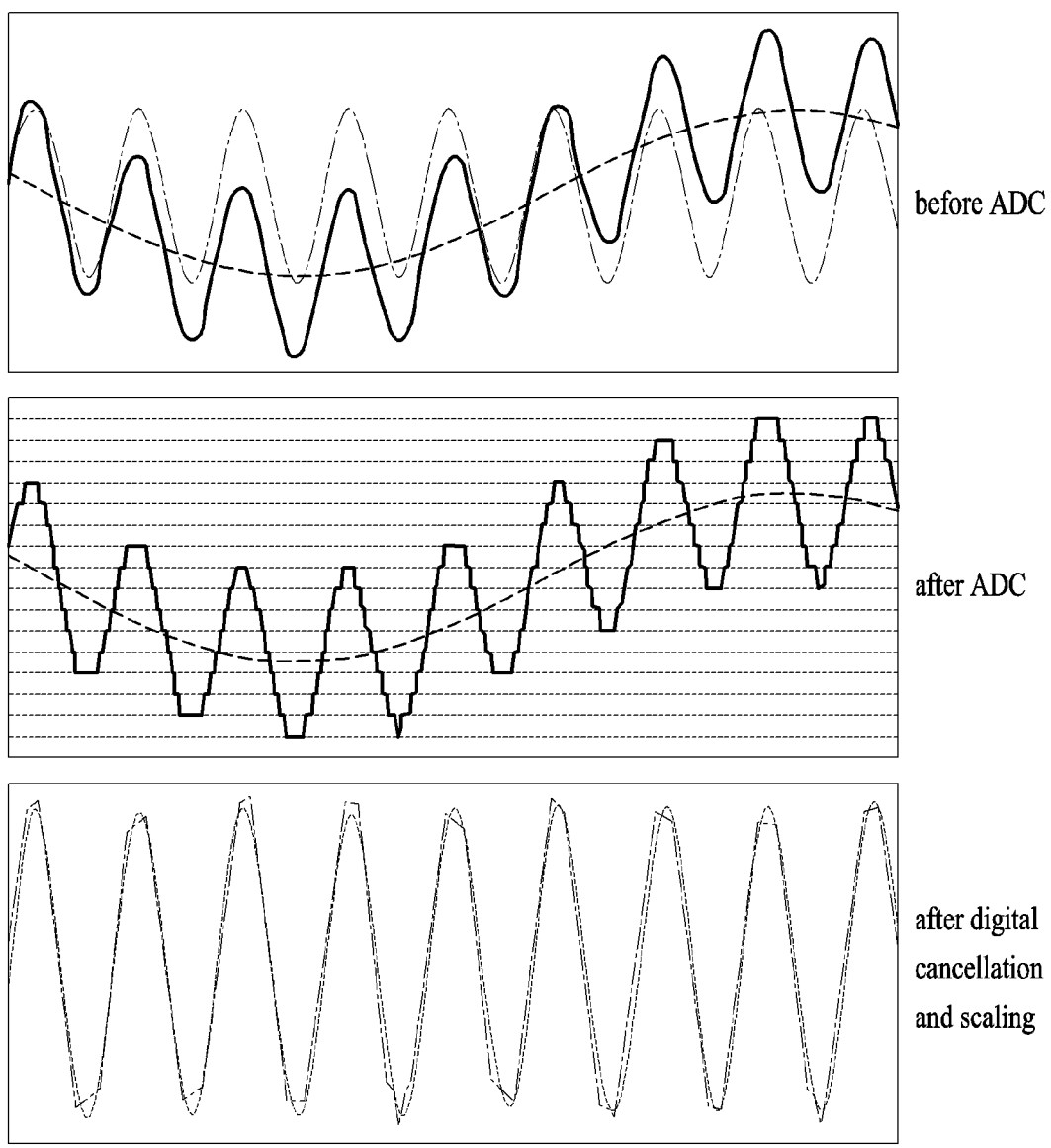
FIG. 12 is a diagram illustrating restoration of a desired signal after an interference signal is cancelled when a power of the interference signal is lower than that of the desired signal.

As can be seen from FIGS. 11 and 12, the desired signal may be received well such that self-interference may be properly cancelled. A method for cancelling self-interference may be categorized into a total of four methods depending on a position where the interference cancellation is performed.

Figure 13:
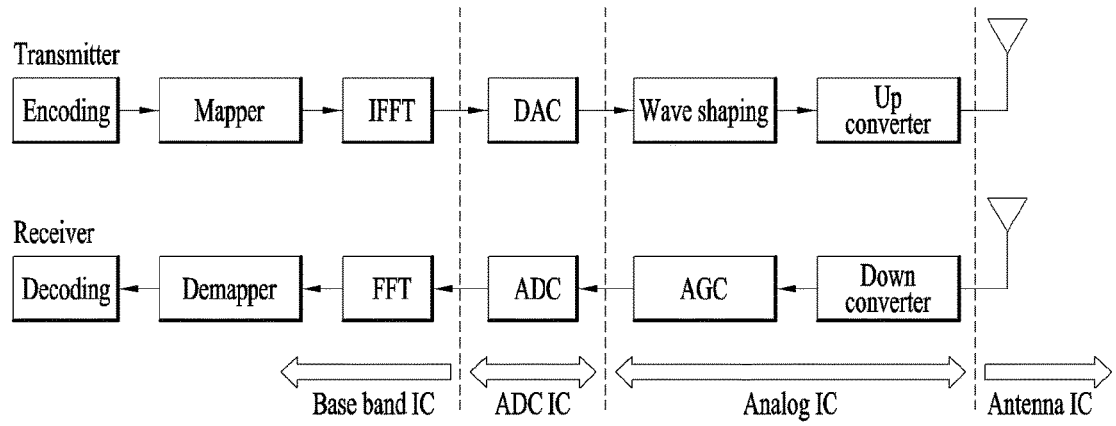
FIG. 13 is a block diagram illustrating a position where a method for self-interference cancellation (IC) is performed.

FIG. 13 is a block diagram illustrating a position where a method for self-interference cancellation (IC) is performed.

First of all, an antenna IC method will be described.

Figure 14:
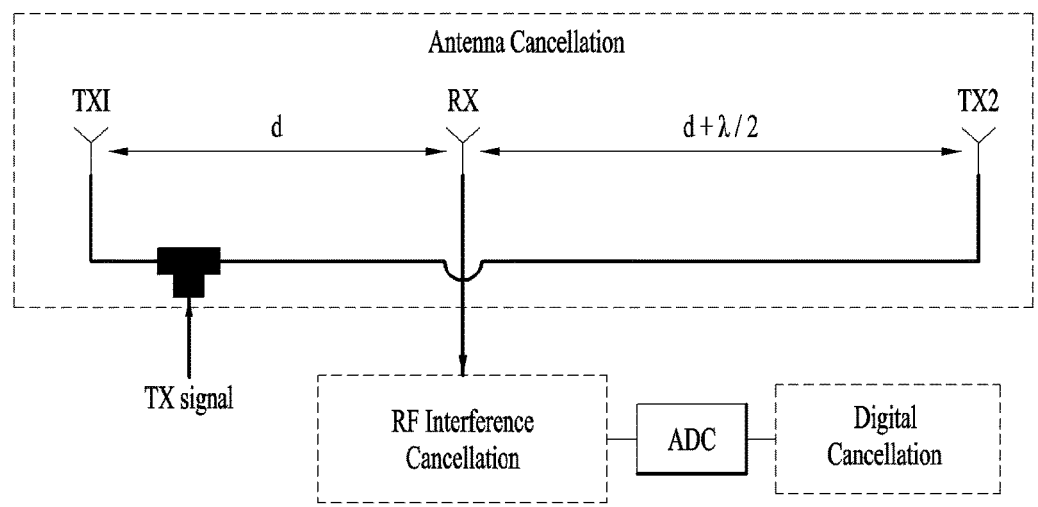
FIG. 14 is an example of an antenna IC method.

The antenna IC method is the simplest method of all IC methods, and may be implemented as shown in FIG. 14 to perform antenna IC.

That is, one UE may perform interference cancellation by using three antennas, two of which are used as transmitting antennas and the other one is used as a receiving antenna. The two transmitting antennas are installed at a distance of wavelength/2 based on the receiving antenna. For this reason, a signal transmitted from each transmitting antenna is received as a signal, of which phase is inverted, in view of the receiving antenna. Therefore, an interference signal of the signals finally received by the receiving antenna is converged to 0.

Figure 15:
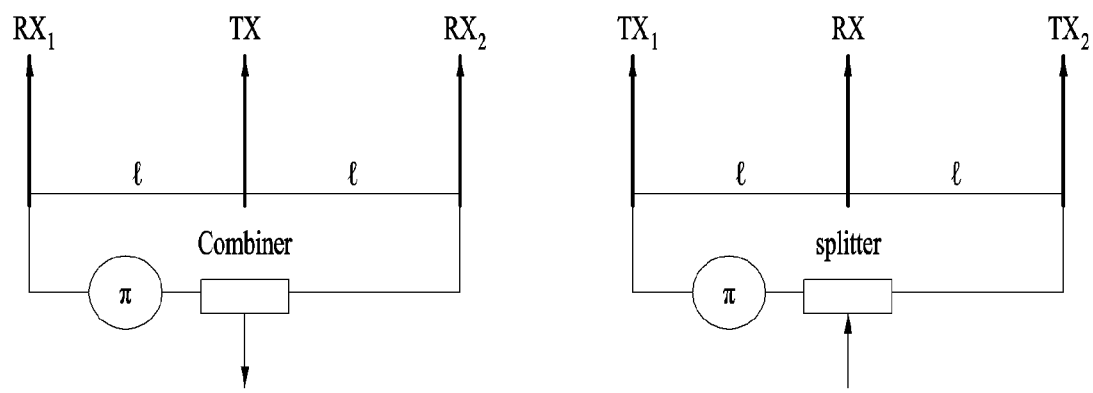
FIG. 15 is an example of an IC method based on a phase shifter.

Alternatively, instead of using the distance between the antennas as shown in FIG. 14 to invert phase of the second transmitting antenna, a phase shifter may be used as shown in FIG. 15 to cancel an interference signal.

In FIG. 15, a left structure illustrates that self-interference cancellation is performed using two receiving antennas, and a right structure illustrates that interference is cancelled using two transmitting antennas.

Figure 16:
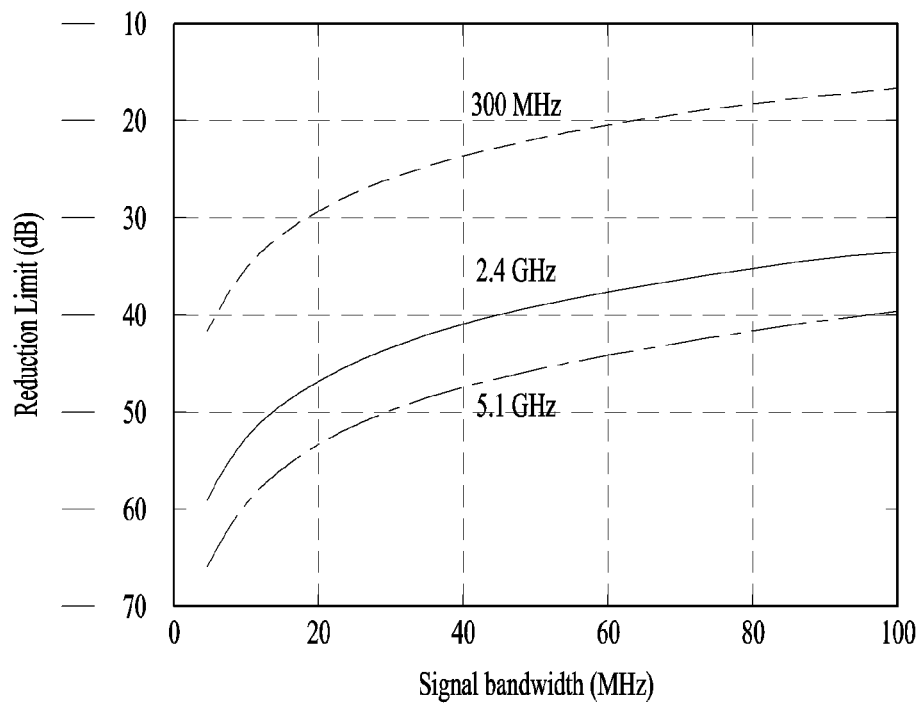
FIG. 16 is a graph illustrating interference cancellation performance according to a bandwidth of a signal and center frequency.

This antenna IC method is affected by a bandwidth of a transmitted signal and a center frequency. That is, the smaller the bandwidth of the transmitted signal is and the higher the center frequency is, interference cancellation performance is increased. FIG. 16 illustrates interference cancellation performance according to a bandwidth of a signal and center frequency.

Secondly, an ADC (analog-digital converter) IC method will be described.

The greatest problem which cannot cancel interference even though the interference signal is a known signal is caused by loss during the ADC procedure as described above. The ADC IC method is a method for easily cancelling interference by maximizing performance of the ADC.

The ADC IC method has a problem that its application is difficult due to quantization bit restriction of the ADC in view of implementation. However, as ADC performance is gradually improved, interference cancellation efficiency may be increased.

Thirdly, an analog IC method will be described.

The analog IC method is a method for cancelling interference before ADC, and cancels self-interference by using an analog signal. The analog IC method may be performed in a radio frequency (RF) region or an intermediate frequency (IF) region. The simplest analog IC method is to attenuate an analog signal which is transmitted, from a signal received by the receiving antenna by performing phase and time delay for the analog signal.

An advantage of the analog IC method is that one transmitting antenna and one receiving antenna are only required unlike the antenna IC method.

However, since the analog IC method is performed using the analog signal, its implementation is complicated and additional distortion may occur due to its circuit characteristics.

Fourthly, a digital IC method will be described.

The digital IC method is a method for cancelling interference after the ADC, and includes all interference cancellation methods performed in a base band. The simplest digital IC method is to attenuate a transmitted digital signal from a digital signal which is received. Alternatively, a UE or eNB, which transmits a signal by using multiple antennas, may use beamforming or precoding so as to allow the transmitted signal not to be received by the receiving antenna. If these methods are performed in a base band, these methods may be categorized as the digital IC method.

However, since the digital IC may be performed only when quantization is performed for a digital modulated signal to recover information on a desired signal, interference is cancelled by one or more of the aforementioned methods and then a size difference of signal powers between an interference signal and a desired signal should be within an ADC range to perform digital IC.

Figure 17:
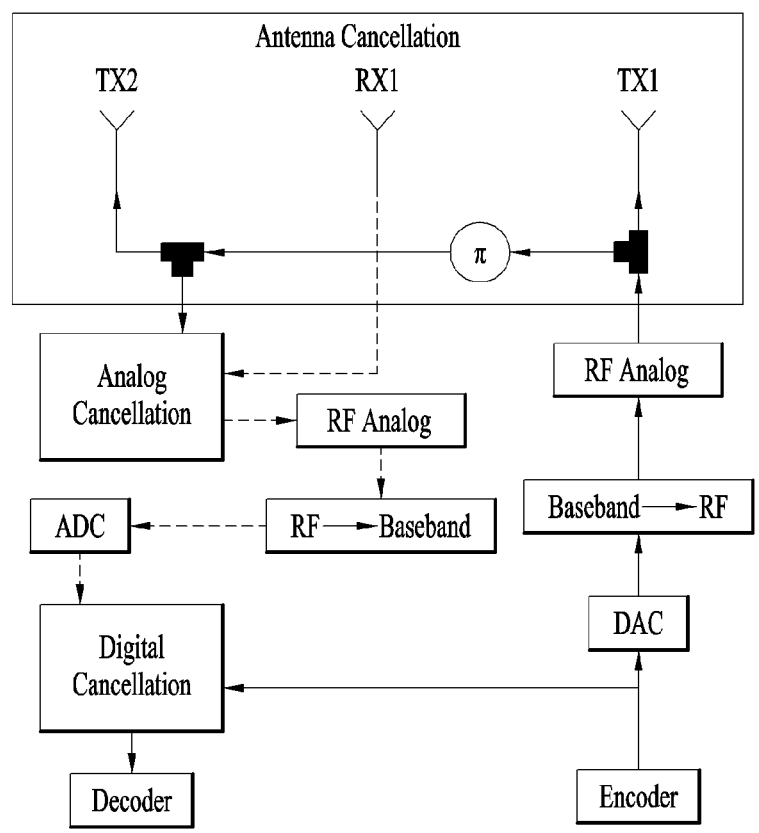
FIG. 17 illustrates a system to which a plurality of IC methods are simultaneously applied.

FIG. 17 illustrates a system to which the aforementioned four IC methods are simultaneously applied. In FIG. 17, whole interference cancellation performance is determined as the interference cancellation methods of the respective regions are combined.

Hereinafter, a frame structure and method for cancelling self-interference and improving whole cell throughput through the simplest antenna IC method of the aforementioned methods will be described. In this case, it will be apparent that the method according to the present invention may be applied even in a state that the other IC methods as well as the antenna IC method are all applied.

Radio Frame Structure

Figure 18:
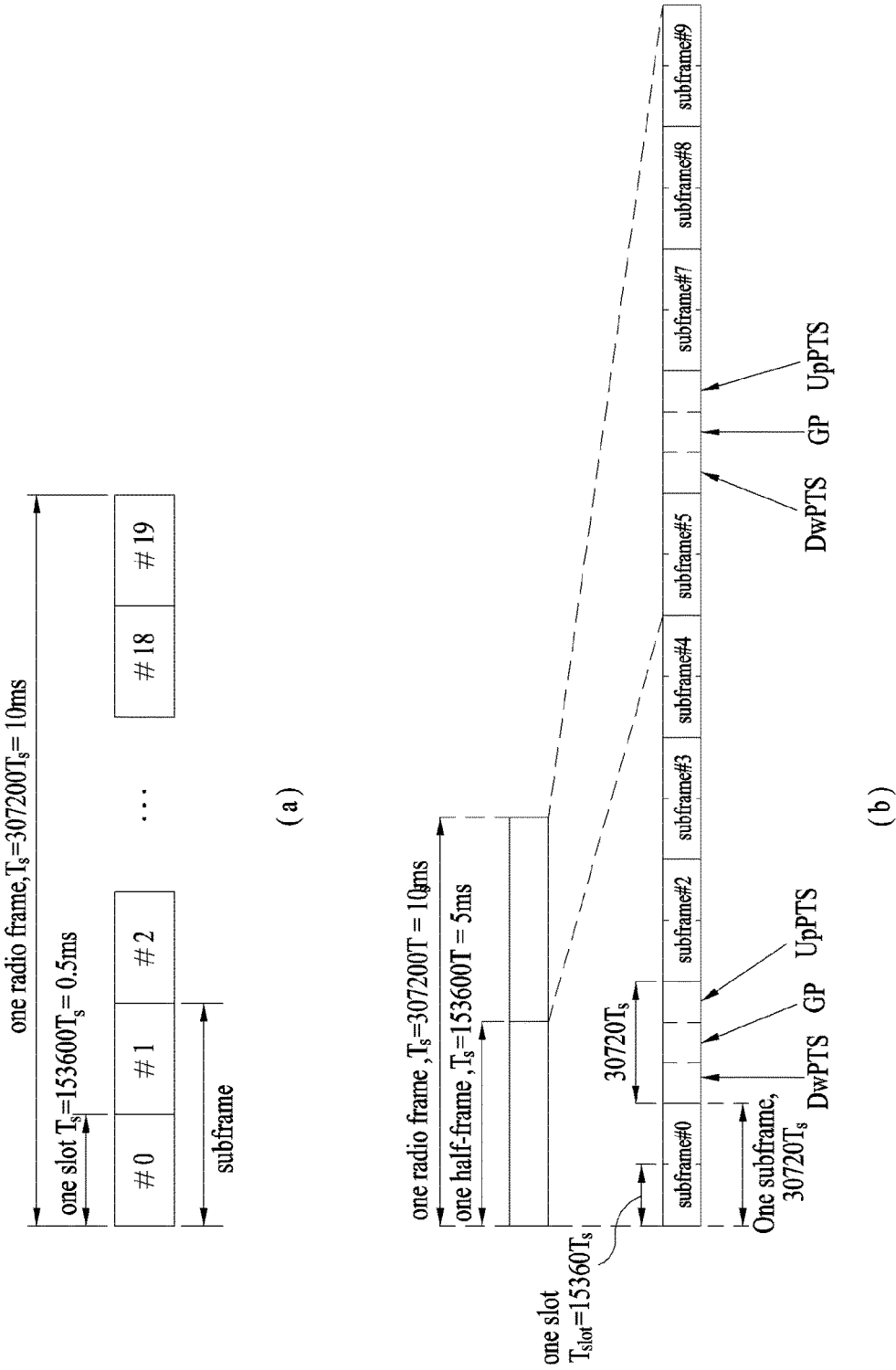
FIG. 18 illustrates a structure of a radio frame in 3GPP LTE.

FIG. 18 illustrates a structure of a radio frame in 3GPP LTE.

FIG. 18(a) illustrates a frame structure type 1. The frame structure type 1 may be applied to both a full duplex FDD (frequency division duplex) system and a half duplex FDD system.

One radio frame is 10 ms ($T_f = 307200 \cdot T_s$) long, including equal-sized 20 slots indexed from 0 to 19. Each slot is 0.5 ms ($T_{slot} = 15360 \cdot T_s$) long. One subframe includes two consecutive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). In this case, Ts is a sampling time given as $T_s = 1/(15 \text{ kHz} \times 2048) = 3.2552 \times 10^{-8}$ (about 33 ns). A slot includes a plurality of Orthogonal Frequency Division Multiplexing (OFDM) symbols or SC-FDMA symbols in the time domain and includes a plurality of Resource Blocks (RBs) in the frequency domain.

One slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. A resource block (RB) is a resource allocation unit including a plurality of consecutive subcarriers in one slot.

In a full FDD system, each of 10 subframes may be used simultaneously for DL transmission and UL transmission during a 10-ms duration. At this time, the DL transmission and the UL transmission are distinguished from each other in the frequency domain. On the other hand, a UE cannot perform transmission and reception simultaneously in a half FDD system.

The number of OFDM symbols in one slot may be varied depending on a Cyclic Prefix (CP) configuration. There are two types of CPs: extended CP and normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

The above radio frame structure is only exemplary. Thus, the number of subframes included in a radio frame, the number of slots included in a subframe, and the number of OFDM symbols included in a slot may be varied.

FIG. 18(b) illustrates a frame structure type 2. The frame structure type 2 is applied to a Time Division Duplex (TDD) system. One radio frame is 10 ms ($T_f = 307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot} = 15360 \cdot T_s$). In this case, $T_s$ is a sampling time given as $T_s = 1/(15 \text{ kHz} \times 2048) = 3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 illustrates a configuration of the special subframe (length of DwPTS/GP/UpPTS).

In the following embodiment according to the present invention, a PHICH or PUCCH will exemplarily be described as a channel for transmitting ACK/NACK. However, ACK/NACK may be transmitted using another physical channel (for example, e-PHICH, PDSCH, PUSCH).

Hereinafter, a DL/UL switch point periodicity is divided into a case of 10 ms and a case of 5 ms, each of which will

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

FIG. 19 illustrates an example of frame configuration in a radio frame structure of FIG. 18(b).

In FIG. 19, D is a subframe for downlink transmission, U is a subframe for uplink transmission, and S is a special subframe for a guard time.

All UEs within each cell commonly have one frame configuration of the configurations in FIG. 18. That is, since the frame configuration is varied depending on a cell, the frame configuration may be referred to as a cell-specific configuration.

UE-Specific TDD

As described above, TDD is managed by UL/DL configuration fixed within a cell. For this reason, a problem occurs in that it is difficult to UE-specifically reflect traffic of a downlink or uplink required by a UE.

To solve this problem, the UL/DL configuration may be configured UE-specifically. That is, each UE within one cell may have its respective UL/DL configuration, and may improve cell throughput by reflecting required traffic dynamically or semi-statically. This method will be referred to as UE-specific TDD.

Figure 20:
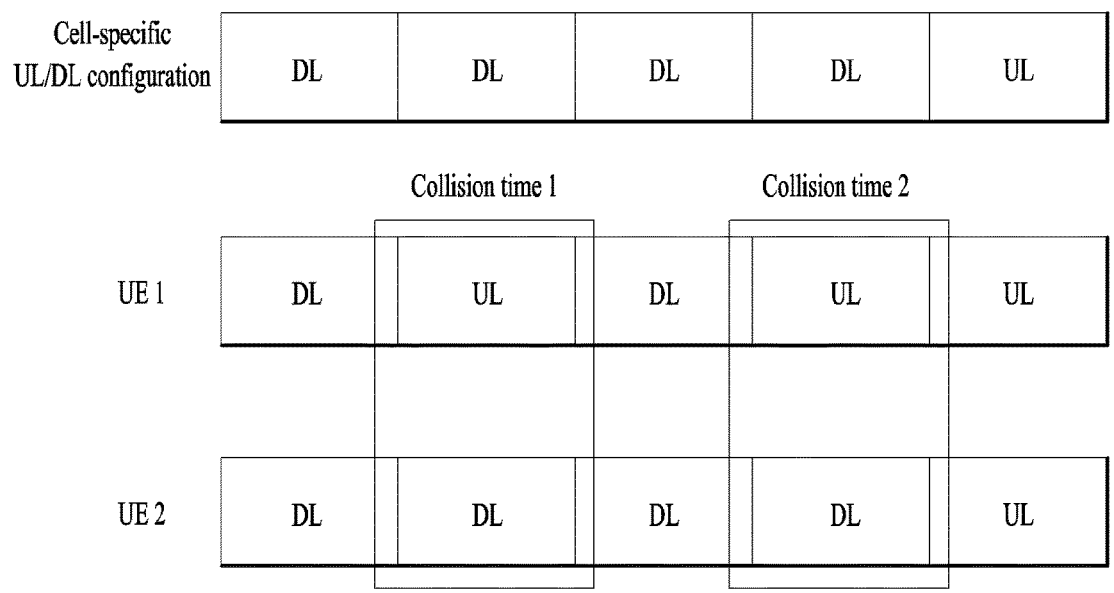
FIG. 20 is an example of resource allocation in UE-specific TDD.

FIG. 20 is an example that UL traffic of a UE 1 is additionally required and thus the UE 1 transmits UL subframe at a resource configured as a DL subframe when a cell-specific DL/UL configuration is defined. In this case, collision occurs twice as shown in FIG. 20, and an eNB should receive a UL signal transmitted from the UE 1. To this end, the eNB should cancel self-interference, and should be operated in a full duplex (FD). That is, to support UE-specific TDD, the eNB should cancel self-interference and should be operated in FD.

Method for Configuring Feedback Transmission Timing

When the aforementioned UE-specific TDD is applied, transmission timing of feedback information (for example, HARQ) should be defined. In the legacy system, an ACK (Acknowledgement)/NACK (negative ACK) transmission period is fixed cell-specifically due to the UL-DL configuration which is cell-specifically managed. However, in UE-specific TDD, since each UE has its respective UL-DL configuration, ACK/NACK transmission time (subframe) should be designated to adapt to each configuration.

be described by being subdivided into a UL-DL subframe ratio. Alternatively, UL-DL configuration may be configured by aggregating the case of a DL/UL switch point periodicity of 10 ms and the case of a DL/UL switch point periodicity of 5 ms.

Also, in the following embodiment, it is assumed that DL subframe of at least once and UL subframe of at least once are required for UL-DL configuration and a special subframe is transmitted between the DL subframe and the UL subframe. In this case, the UL-DL configuration is configured in the order of the DL subframe, the special subframe and the UL subframe, and a position of a radio frame where the corresponding subframes will be located may be managed cell-specifically or UE-specifically.

Hereinafter, for convenience of description, it is assumed that first three subframes of a radio frame are a DL subframe, a special subframe and a UL subframe in due order. The special subframe is assumed as the DL subframe to calculate DL/UL radio.

10 ms DL/UL Switch Point Periodicity

The following embodiment relates to a DL/UL switch point periodicity of 10 ms period.

If the DL/UL switch point periodicity is set to 10 ms, since the DL/UL switch point occurs once for a radio frame, a guard period is required once. Therefore, resource efficiency may be increased. However, a problem occurs in that latency may occur as an immediate DL/UL switch is not available due to a restriction of the DL/UL switch point.

The following Table 2 illustrates an example of a subframe configuration in case of a DL/UL switch point periodicity of 10 ms and a DL:UL subframe ratio of 9:1. In the following Table 2, a first line indicates a subframe number.

TABLE 2

| 0 | 1 | 2 | 3 | 4 | 5 | 6 | 7 | 8 | 9 |
| --- | --- | --- | --- | --- | --- | --- | --- | --- | --- |
| D | S | U | D | D | D | D | D | D | D |

Referring to Table 2, a PUCCH is transmitted through the subframe number 2 to transmit ACK/NACK for the DL subframe.

When the subframe number through which the PUCCH is transmitted is designated as 'n' and a transmission position of a PDSCH connected to ACK/NACK transmitted through the PUCCH or a PDCCH for scheduling the PDSCH is defined as 'n−k', a set K (bundling window size) of k may be expressed as illustrated in the following Table. When a size of K is defined as m, K:{k0,k1, . . . , km−1} may be expressed. This DL/UL radio is assumed as UL/DL configuration 0.

TABLE 3

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 13, 12, 11, 9, 8, 7, 6, 5, 4 | | | | | | | |

The following Table 4 illustrates an example of a subframe configuration in case of a DL/UL switch point periodicity of 10 ms and a DL:UL subframe ratio of 8:2. In the following Table 3, a first line indicates a subframe number.

TABLE 4

| 0 | 1 | 2 | 3 | 4 | 5 | 6 | 7 | 8 | 9 |
|---|---|---|---|---|---|---|---|---|---|
| D | S | U | U | D | D | D | D | D | D |

A PUCCH is transmitted through the subframe numbers 2 and 3 to transmit ACK/NACK for the DL subframe. At this time, k and K may be expressed as illustrated in the following Table. This DL/UL radio is assumed as UL/DL configuration 1.

TABLE 5

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | | | 12, 11, 8, 7 | 7, 6, 5, 4 | | | | | | |

The following Table 6 illustrates an example of a subframe configuration in case of a DL/UL switch point periodicity of 10 ms and a DL:UL subframe ratio of 7:3. In the following Table 6, a first line indicates a subframe number.

TABLE 6

| 0 | 1 | 2 | 3 | 4 | 5 | 6 | 7 | 8 | 9 |
|---|---|---|---|---|---|---|---|---|---|
| D | S | U | U | U | D | D | D | D | D |

Referring to Table 6, a PUCCH is transmitted through the subframe numbers 2, 3 and 4 to transmit ACK/NACK for the DL subframe. At this time, k and K may be expressed as follows. This DL/UL radio is assumed as UL/DL configuration 2.

TABLE 7

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 | | | 11, 7, 6 | 6, 5 | 5, 4 | | | | | |

The following Table 8 illustrates an example of a subframe configuration in case of a DL/UL switch point periodicity of 10 ms and a DL:UL subframe ratio of 6:4. In the following Table 8, a first line indicates a subframe number.

TABLE 8

| 0 | 1 | 2 | 3 | 4 | 5 | 6 | 7 | 8 | 9 |
|---|---|---|---|---|---|---|---|---|---|
| D | S | U | U | U | U | D | D | D | D |

Referring to Table 8, a PUCCH is transmitted through the subframe numbers 2, 3, 4 and 5 to transmit ACK/NACK for the DL subframe. At this time, k and K may be expressed as follows. This DL/UL radio is assumed as UL/DL configuration 3.

TABLE 9

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | | | 6, 5 | 5, 4 | 4 | 4 | | | | |

The following Table 10 illustrates an example of a subframe configuration in case of a DL/UL switch point periodicity of 10 ms and a DL:UL subframe ratio of 5:5. In the following Table 10, a first line indicates a subframe number.

TABLE 10

| 0 | 1 | 2 | 3 | 4 | 5 | 6 | 7 | 8 | 9 |
|---|---|---|---|---|---|---|---|---|---|
| D | S | U | U | U | U | U | D | D | D |

Referring to Table 10, a PUCCH is transmitted through the subframe numbers 2, 3, 4, 5 and 6 to transmit ACK/NACK for the DL subframe. At this time, k and K may be expressed as follows. This DL/UL radio is assumed as UL/DL configuration 4.

TABLE 11

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | | | 5 | 5 | 5 | 5 | 5 | | | |

The following Table 12 illustrates an example of a subframe configuration in case of a DL/UL switch point periodicity of 10 ms and a DL:UL subframe ratio of 4:6. In the following Table 12, a first line indicates a subframe number.

TABLE 12

| 0 | 1 | 2 | 3 | 4 | 5 | 6 | 7 | 8 | 9 |
|---|---|---|---|---|---|---|---|---|---|
| D | S | U | U | U | U | U | U | D | D |

Referring to Table 12, a PUCCH is transmitted through the subframe numbers 2, 3, 4 and 5 to transmit ACK/NACK for the DL subframe. At this time, k and K may be expressed as follows. This DL/UL radio is assumed as UL/DL configuration 5.

TABLE 13

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | | | | | 4 | 4 | 4 | 4 | | |

The following Table 14 illustrates an example of a subframe configuration in case of a DL/UL switch point periodicity of 10 ms and a DL:UL subframe ratio of 3:7. In the following Table 14, a first line indicates a subframe number.

TABLE 14

| 0 | 1 | 2 | 3 | 4 | 5 | 6 | 7 | 8 | 9 |
|---|---|---|---|---|---|---|---|---|---|
| D | S | U | U | U | U | U | U | U | D |

Referring to Table 14, a PUCCH is transmitted through the subframe numbers 3, 4 and 5 to transmit ACK/NACK for the DL subframe. At this time, k and K may be expressed as follows. This DL/UL radio is assumed as UL/DL configuration 6.

TABLE 15

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6 | | | | | 4 | 4 | 4 | | | |

The following Table 16 illustrates an example of a subframe configuration in case of a DL/UL switch point periodicity of 10 ms and a DL:UL subframe ratio of 2:8. In the following Table 16, a first line indicates a subframe number.

TABLE 16

| 0 | 1 | 2 | 3 | 4 | 5 | 6 | 7 | 8 | 9 |
|---|---|---|---|---|---|---|---|---|---|
| D | S | U | U | U | U | U | U | U | U |

Referring to Table 14, a PUCCH is transmitted through the subframe numbers 4 and 5 to transmit ACK/NACK for the DL subframe. At this time, k and K may be expressed as follows. This DL/UL radio is assumed as UL/DL configuration 7.

TABLE 17

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 7 | | | | | 4 | 4 | | | | |

5 ms DL/UL Switch Point Periodicity

If the DL/UL switch point periodicity is set to 5 ms, since the DL/UL switch point occurs twice for a radio frame, a guard period is required twice. For this reason, resource efficiency is deteriorated. However, the DL/UL switch is available more freely than the 10 ms DL/UL switch point periodicity, whereby is it advantageous that latency may be reduced.

The following Table 18 illustrates an example of a subframe configuration in case of a DL/UL switch point periodicity of 5 ms and a DL:UL subframe ratio of 8:2. In the following Table 18, a first line indicates a subframe number.

TABLE 18

| 0 | 1 | 2 | 3 | 4 | 5 | 6 | 7 | 8 | 9 |
|---|---|---|---|---|---|---|---|---|---|
| D | S | U | D | D | D | S | U | D | D |

A PUCCH is transmitted through the subframe numbers 2 and 7 to transmit ACK/NACK for the DL subframe. When the subframe number through which the PUCCH is transmitted is designated as 'n' and a transmission position of a PDSCH connected to ACK/NACK transmitted through the PUCCH or a PDCCH for scheduling the PDSCH is defined as 'n−k', a set K (bundling window/size) of k may be expressed as follows. When a size of K is defined as M, K:{k0,k1, . . . , kM−1} may be expressed. This DL/UL radio is assumed as UL/DL configuration 0.

TABLE 19

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 8, 7, 6, 4 | | | | | 8, 7, 6, 4 | | |

The following Table 20 illustrates an example of a subframe configuration in case of a DL/UL switch point periodicity of 5 ms and a DL:UL subframe ratio of 7:3. In the following Table 20, second and third lines indicate that a UL-DL subframe ratio is equally maintained but a proportion of the UL subframe is different depending on front and rear positions within one radio frame.

TABLE 20

| 0 | 1 | 2 | 3 | 4 | 5 | 6 | 7 | 8 | 9 |
|---|---|---|---|---|---|---|---|---|---|
| D | S | U | U | D | D | S | U | D | D |
| D | S | U | D | D | D | S | U | U | D |

Referring to Table 20, a PUCCH may be transmitted through the subframe numbers 2, 3 and 7 or the subframe numbers 2, 7 and 8 to transmit ACK/NACK for the DL subframe. At this time, k and K may be expressed as follows. This DL/UL radio is assumed as UL/DL configuration 1-a/b.

TABLE 21

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1-a | | | 8, 7, 6 | 5, 4 | | | | 7, 6 | | |
| 1-b | | | 7, 6 | | | | | 8, 7, 6 | 5, 4 | |

The following Table 22 illustrates an example of a subframe configuration in case of a DL/UL switch point periodicity of 5 ms and a DL:UL subframe ratio of 6:4. In the following Table 22, a first line indicates a subframe number. In the following Table 22, second to fourth lines indicate that a UL-DL subframe ratio is equally maintained but is varied depending on a position of the UL subframe.

TABLE 22

| 0 | 1 | 2 | 3 | 4 | 5 | 6 | 7 | 8 | 9 |
|---|---|---|---|---|---|---|---|---|---|
| D | S | U | U | D | D | S | U | U | D |
| D | S | U | U | U | D | S | U | D | D |
| D | S | U | D | D | D | S | U | U | U |

Referring to Table 22, a PUCCH may be transmitted through the subframe numbers 2, 3, 7 and 8, the subframe numbers 2, 3, 4 and 7 or the subframe numbers 2, 7, 8 and 9 to transmit ACK/NACK for the DL subframe. At this time, k and K may be expressed as follows. This DL/UL radio is assumed as UL/DL configuration 2-a/b/c.

TABLE 23

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2-a | | | 7, 6 | 4 | | | | 7, 6 | 4 | |
| 2-b | | | 7, 6 | 5, 4 | 4 | | | 6 | | |
| 2-c | | | 6 | | | | | 7, 6 | 5, 4 | 4 |

The following Table 24 illustrates an example of a subframe configuration in case of a DL/UL switch point periodicity of 5 ms and a DL:UL subframe ratio of 5:5. In the following Table 24, a first line indicates a subframe number. In the following Table 24, second and third lines indicate that a UL-DL subframe ratio is equally maintained but a proportion of the UL subframe is different depending on front and rear positions within one radio frame.

TABLE 24

| 0 | 1 | 2 | 3 | 4 | 5 | 6 | 7 | 8 | 9 |
|---|---|---|---|---|---|---|---|---|---|
| D | S | U | U | U | D | S | U | U | D |
| D | S | U | U | D | D | S | U | U | U |

Referring to Table 22, a PUCCH may be transmitted through the subframe numbers 2, 3, 4, 7 and 8 or the subframe numbers 2, 3, 7, 8 and 9 to transmit ACK/NACK for the DL subframe. At this time, k and K may be expressed as follows. This DL/UL radio is assumed as UL/DL configuration 3-a/b.

TABLE 25

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3-a | | | 7 | 7 | 5 | | | 7 | 7 | |
| 3-b | | | 7 | 7 | | | | | 7 | 7 | 5 |

The following Table 26 illustrates an example of a subframe configuration in case of a DL/UL switch point periodicity of 5 ms and a DL:UL subframe ratio of 4:6. In the following Table 26, a first line indicates a subframe number.

TABLE 26

| 0 | 1 | 2 | 3 | 4 | 5 | 6 | 7 | 8 | 9 |
|---|---|---|---|---|---|---|---|---|---|
| D | S | U | U | U | D | S | U | U | U |

Referring to Table 26, a PUCCH is transmitted through the subframe numbers 2, 4, 7 and 9 to transmit ACK/NACK for the DL subframe. At this time, k and K may be expressed as follows. This DL/UL radio is assumed as UL/DL configuration 4.

TABLE 27

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | | | 6 | | 4 | | | 6 | | 4 |

Aggregation of Configurations According to Switch Point Periodicity

The configurations according to the 10 ms DL/UL switch point periodicity and the configurations according to the 5 ms DL/UL switch point periodicity have been described respectively. To this end, an eNB should deliver information on the DL/UL switch point periodicity to a UE. However, if the eNB configures UL-DL configurations corresponding to the case of the DL/UL switch point periodicity of 5 ms and the case of the DL/UL switch point periodicity of 10 ms by means of aggregation instead of delivering the information to the UE, the UE may implicitly acquire the information on the DL/UL switch point periodicity.

The following Table is an example corresponding to the case that the UL-DL configurations of the DL/UL switch point periodicity of 5 ms and the DL/UL switch point periodicity of 10 ms are configured by aggregation. Also, since sub-configuration for each configuration has the same UL/DL ratio, the sub-configurations may be used as one configuration.

TABLE 28

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 13, 12, 11, 9, 8, 7, 6, 5, 4 | | | | | | | |
| 1 | | | 12, 11, 8, 7 | 7, 6, 5, 4 | | | | | | |
| 2 | | | 11, 7, 6 | 6, 5 | 5, 4 | | | | | |
| 3 | | | 6, 5 | 5, 4 | 4 | 4 | | | | |
| 4 | | | 5 | 5 | 5 | 5 | 5 | | | |
| 5 | | | 4 | 4 | 4 | 4 | | | | |
| 6 | | | | 4 | 4 | 4 | | | | |
| 7 | | | | | 4 | 4 | | | | |
| 8 | | | 8, 7, 6, 4 | | | | | 8, 7, 6, 4 | | |
| 9-a | | | 8, 7, 6 | 5, 4 | | | | 7, 6 | | |
| 9-b | | | 7, 6 | | | | | 8, 7, 6 | 5, 4 | |
| 10-a | | | 7, 6 | 4 | | | | 7, 6 | 4 | |
| 10-b | | | 7, 6 | 5, 4 | 4 | | | 6 | | |
| 10-c | | | 6 | | | | | 7, 6 | 5, 4 | 4 |
| 11-a | | | 7 | 7 | 5 | | | 7 | 7 | |
| 12-b | | | 7 | 7 | | | | 7 | 7 | 5 |
| 13 | | | 6 | | 4 | | | 6 | | 4 |

The UL-DL configurations for the DL/UL switch point periodicities of 5 ms and 10 ms may be aggregated as illustrated in Table 28 above, whereby a transmission time of a PUCCH for transmitting ACK/NACK for a PDSCH or a PDCCH for scheduling the PDSCH may be set.

Generalization of a Method for Configuring Feedback Information Transmission Timing The aforementioned feedback information transmission timing setup may be configured using the following method.

1. A PUCCH is transmitted at a UL subframe greater than at least 4 ms but closest to the time when a PDSCH or a PDCCH for scheduling the PDSCH is transmitted.

2. A PUCCH transmitted at each UL subframe is uniformly distributed, whereby a bundling window size (M) value is distributed based on the following reference so as not to have a great value at a specific subframe.

2.1. If (the number of DL subframes)/(the number of UL subframes) is 1 or less, a PUCCH transmission time is set at a UL subframe for a PDSCH or a PDCCH for scheduling the PDSCH. Afterwards, PUCCH transmission for a PDSCH or a PDCCH for scheduling the PDSCH is performed using next UL subframe.

For example, the DL:UL subframe ratio in the Tables 12 and 13 is 4:6, and (the number of DL subframes)/(the number of UL subframes) is 1 or less. At the subframe number 2, ACK/NACK of the DL subframe prior to 4 subframes is transmitted. Likewise, at the subframe numbers 3, 4 and 5, ACK/NACK of the DL subframe prior to 4 subframes is transmitted.

2.2. If (the number of DL subframes)/(the number of UL subframes) is an integer (x:{1,2,3,4}), a PUCCH transmission time is set at a UL subframe for x number of consecutive PDSCHs or a PDCCH for scheduling the PDSCHs. Afterwards, PUCCH transmission for next x number of consecutive PDSCHs or a PDCCH for scheduling the PDSCHs is performed using next UL subframe.

For example, the DL:UL subframe ratio in the Tables 4 and 5 is 8:2, and (the number of DL subframes)/(the number of UL subframes) is an integer 4. Therefore, ACK/NACK for 4 consecutive DL subframes is transmitted at UL subframe number 2, and ACK/NACK for next 4 consecutive DL subframes is transmitted at UL subframe number 3.

At the subframe number 2, ACK/NACK of the DL subframe prior to 4 subframes is transmitted. Likewise, at the subframe numbers 3, 4 and 5, ACK/NACK of the DL subframe prior to 4 subframes is transmitted.

2.3. If (the number of DL subframes)/(the number of UL subframes) is greater than an integer (x:{1,2,3,4}) and smaller than an integer (x+1:{2,3,4,5}), that is, if (the number of DL subframes)/(the number of UL subframes) exceeds 1, an integer obtained as a result of the other operation (the number of DL subframes) % (the number of UL subframes) is defined as y. At this time, a procedure of setting a PUCCH transmission time at a UL subframe for x+1 number of consecutive PDSCHs or a PDCCH for scheduling the PDSCHs is repeated y times. Afterwards, PUCCH transmission for next x number of consecutive PDSCHs or a PDCCH for scheduling the PDSCHs is performed using next UL subframe.

For example, the DL:UL subframe ratio in the Tables 6 and 7 is 7:3, and (the number of DL subframes)/(the number of UL subframes) is an integer 2 and 1/3. That is, x is 2, and y is 1. Therefore, ACK/NACK is transmitted at the first UL subframe for 3 consecutive DL subframes, and ACK/NACK for 2 consecutive DL subframes is transmitted at next two UL subframes.

Figure 21:
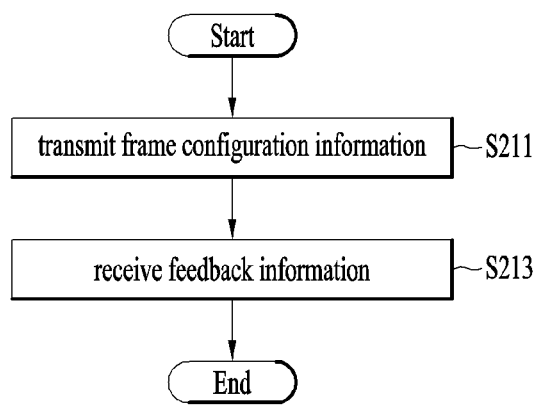
FIG. 21 is a flow chart according to one embodiment of the present invention.

FIG. 21 is a flow chart illustrating a method for receiving feedback information according to one embodiment of the present invention.

Referring to FIG. 21, first of all, an eNB transmits frame configuration information of UE-specific TDD to a UE.

Afterwards, the eNB receives feedback information at a UL subframe according to the frame configuration information.

A detailed method for determining a timing of feedback information may be determined in accordance with the aforementioned embodiments.

Also, as described above, the frame configuration information of the UE-specific TDD may be determined by the eNB and then transmitted to the UE, or may be determined by the UE and then transmitted to the eNB.

If a bundling window size of the feedback information is determined, two methods of a bundling method and a multiplexing method may be considered to transmit HARQ through a PUCCH.

First of all, the bundling method means that ACK/NACK bits for a plurality of subframes are grouped into one bit through AND operation. Although the bundling method may include a spatial bundling method performed for codewords, bundling is generally defined as time (subframe) bundling.

Next, the multiplexing method means a method for transmitting ACK/NACK bits for each subframe independently without performing bundling.

Meanwhile, the FDD system of the legacy LTE-A release-10 may support two maximum codewords and perform five maximum downlink carrier aggregations. Therefore, maximum bits to be transmitted by Pcell UL carrier are 10 bits. However, even though the TDD system supports two maximum codewords and performs five maximum downlink carrier aggregations, bits to be transmitted are varied depending on a bundling window size. In case of UL-DL configuration number 5, a bundling window size is 10, and the other configurations except the UL-DL configuration number 5 have a bundling window size of maximum 4. Therefore, the following operations are preferably performed in the TDD system due to a problem that bits to be transmitted are too great.

1. In case of the UL-DL configuration number 5, bundling is performed. Therefore, ACK/NACK bits to be transmitted to a PUCCH are determined as 1 or 2 bits depending on the number of codewords.

2. If the bundling method is not configured by higher layer signaling in the other configurations, after spatial bundling is performed, the bits are transmitted by multiplexing. Therefore, since the bundling window size is maximum 4, ACK/NACK bits to be transmitted are determined as 4 bits regardless of the number of codewords in case of one configured serving cell. If CA is performed for DL carrier of 5, 20 bits should be transmitted.

The aforementioned characteristics of the LTE may be applied to the embodiment of the present invention. That is, in the embodiment of the present invention, since the bundling window size except UL-DL configuration 0 is maximum 4, the following operations may be performed.

1. If a PUCCH format 3 is not configured, and in case of UL-DL configuration 0, bundling is performed, whereby the bits are transmitted using a PUCCH format 1 a/1b. Alternatively, if the PUCCH format 3 is configured, the bits are transmitted by a PUCCH format 3 by multiplexing without spatial bundling.

2. If the PUCCH format 3 is not configured, UL-DL configurations are 1 to 13, and a bundling window size is 2 or more, spatial bundling is performed, whereby the bits are transmitted using a PUCCH format 1b with channel selection. Alternatively, if the PUCCH format 3 is configured, multiplexing is performed without spatial bundling, and the bits are transmitted by the PUCCH format 3. A table for transmission using a PUCCH format 1b with channel selection is as follows. Meanwhile, which one of tables according to the bundling window sizes listed below will be used may be notified from the eNB to the UE.

The following Table 29 relates to HARQ-ACK multiplexing transmission if the bundling window size is 2.

TABLE 29

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | | No transmission |

The following Table 30 relates to HARQ-ACK multiplexing transmission if the bundling window size is 3.

TABLE 30

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | | No transmission |

The following Table 31 relates to HARQ-ACK multiplexing transmission if the bundling window size is 4.

TABLE 31

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | | No transmission |

The following Table 32 relates to HARQ-ACK multiplexing transmission if the bundling window size is 2.

TABLE 32

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

The following Table 33 relates to HARQ-ACK multiplexing transmission if the bundling window size is 3.

TABLE 33

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

The following Table 34 relates to HARQ-ACK multiplexing transmission if the bundling window size is 4.

TABLE 34

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

In the above Tables 29 to 34, a rule of "10.1.3.1 TDD HARQ-ACK procedure for one configured serving cell" in the 3GPP TS 36.213 v10.3.0 may be used to determine a PUCCH resource $n_{PUCCHi}^{(1,p)}$.

Figure 22:
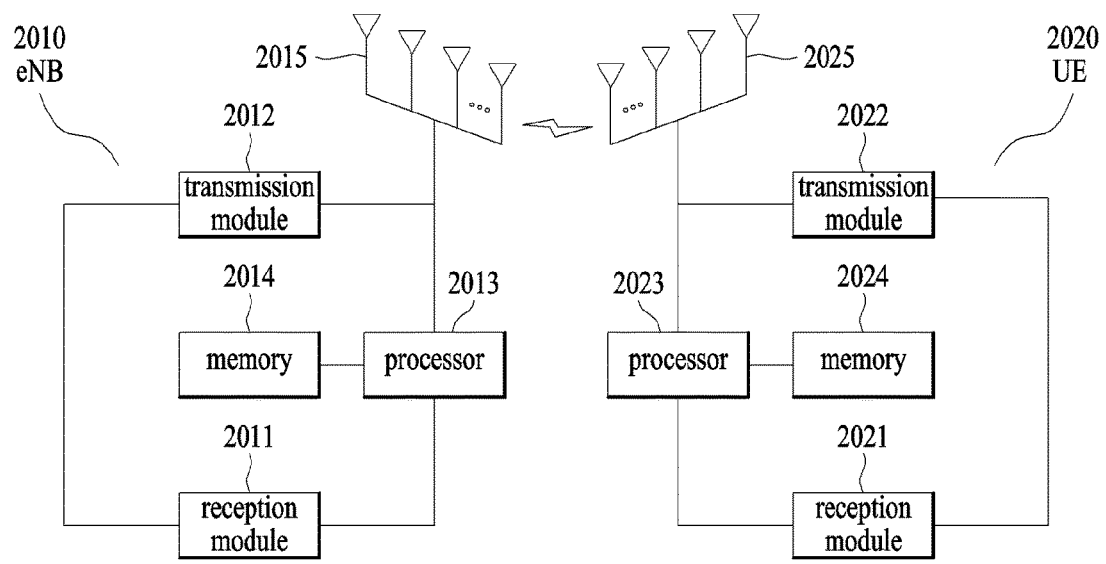
FIG. 22 illustrates an eNB and a UE, which can be applied to one embodiment of the present invention.

FIG. 22 illustrates an eNB and a UE, which can be applied to one embodiment of the present invention.

If a relay is included in a wireless communication system, communication in a backhaul link is performed between the eNB and the relay and communication in an access link is performed between the relay and the UE. Therefore, the eNB or the UE as shown may be replaced with the relay depending on the circumstances.

Referring to FIG. 22, the wireless communication system includes an eNB 2210 and a UE 2220. The eNB 2210 includes a processor 2213, a memory 2214, and radio frequency (RF) units 2211 and 2212. The processor 2213 may be configured to implement procedures and/or methods suggested in the present invention. The memory 2214 is connected with the processor 2213 and stores various kinds of information related to the operation of the processor 2213. The RF unit 2216 is connected with the processor 2213 and transmits and/or receives a radio signal. The UE 2220 includes a processor 2223, a memory 2224, and radio frequency (RF) units 2221 and 2222. The processor 2223 may be configured to implement procedures and/or methods suggested in the present invention. The memory 2224 is connected with the processor 2223 and stores various kinds of information related to the operation of the processor 2223. The RF units 2221 and 2222 are connected with the processor 2223 and transmits and/or receives a radio signal. The eNB 2210 and/or the UE 2220 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed. In this specification, a specific operation which has been described as being performed by the eNB may be performed by an upper node of the eNB as the case may be. In other words, it will be apparent that various operations performed for communication with the UE in the network which includes a plurality of network nodes including the eNB may be performed by the eNB or network nodes other than the eNB. The eNB may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

The preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The present invention may be used for wireless communication systems such as UE, relay, and eNB.

The invention claimed is:

1. A method for receiving feedback information in an evolved Node B (eNB) of a wireless access system supporting full duplex radio (FDR), the method performed by the eNB and comprising the steps of:
    transmitting, to a UE, frame configuration information for UE-specific time division multiplexing (TDD); and
    wherein the frame configuration information indicates a position of the UL subframe, to which feedback information for each DL subframe is to be transmitted, on the basis of a value obtained by dividing the number of downlink (DL) subframes by the number of UL subframes within a radio frame,
    wherein, when the value obtained by dividing the number of DL subframes by the number of UL subframes is an integer 'x', the frame configuration information is configured to sequentially transmit feedback information of x number of DL subframes at the Nth (N is an integer) UL subframe and transmit feedback information of next x number of DL subframes at the (N+1)th UL subframe.

2. The method according to claim 1, wherein, when the value obtained by dividing the number of DL subframes by the number of UL subframes exceeds 1, and when a quotient obtained by dividing the number of DL subframes by the number of UL subframes is an integer 'L' and the remainder is an integer 'M', the frame configuration information is configured to repeat sequential transmission of feedback information for (L+1) number of DL subframes at the Nth UL subframe M times and transmit feedback information for a next L number of DL subframes at the (N+M+1)th UL subframe.

3. The method according to claim 2, wherein, when the value obtained by dividing the number of DL subframes by the number of UL subframes is 1 or less, the frame configuration information is configured to transmit feedback information of one DL subframe at one UL subframe.

4. The method according to claim 1, wherein the frame configuration information is configured based on restrictions that a first subframe is the DL subframe, a second subframe is a special subframe, a third subframe is allocated to the UL subframe, and the UL subframe is continuously allocated.

5. The method according to claim 1, wherein the feedback information is transmitted at a UL subframe 4 ms after a DL subframe corresponding to the feedback information.

6. The method according to claim 1, wherein the frame configuration information is configured by assuming a special subframe as a DL subframe when the number of DL subframes is divided by the number of UL subframes.

7. An evolved Node B (eNB) for receiving feedback information in a wireless access system supporting full duplex radio (FDR), the eNB comprising:
a transmitter and a receiver; and
a processor, operatively coupled to the transmitter and the receiver,
wherein the processor is configured to:
control the transmitter to transmit, to a user equipment (UE), frame configuration information for UE-specific time division multiplexing (TDD); and
control the receiver to receive, from the UE, feedback information at an uplink (UL) subframe according to the frame configuration information,
wherein the frame configuration information indicates a position of the UL subframe, to which feedback information for each DL subframe is to be transmitted, on the basis of a value obtained by dividing the number of downlink (DL) subframes by the number of UL subframes within a radio frame,
wherein, when the value obtained by dividing the number of DL subframes by the number of UL subframes is an integer 'x', the frame configuration information is configured to sequentially transmit feedback information of x number of DL subframes at the Nth (N is an integer) UL subframe and transmit feedback information of next x number of DL subframes at the (N+1)th UL subframe.

8. The eNB according to claim 7, wherein, when the value obtained by dividing the number of DL subframes by the number of UL subframes exceeds 1, and when a quotient obtained by dividing the number of DL subframes by the number of UL subframes is an integer 'L' and the remainder is an integer 'M', the frame configuration information is configured to repeat sequential transmission of feedback information for (L+1) number of DL subframes at the Nth (N is an integer) UL subframe M times and transmit feedback information for a next L number of DL subframes at the (N+M+1)th UL subframe.

9. The eNB according to claim 8, wherein, when the value obtained by dividing the number of DL subframes by the number of UL subframes is 1 or less, the frame configuration information is configured to transmit feedback information for one DL subframe at one UL subframe.

10. The eNB according to claim 7, wherein the frame configuration information is configured based on restrictions that a first subframe is the DL subframe, a second subframe is a special subframe, a third subframe is allocated to the UL subframe, and the UL subframe is continuously allocated.

11. The eNB according to claim 10, wherein the feedback information is transmitted at a UL subframe 4 ms after a DL subframe corresponding to the feedback information.

12. The eNB according to claim 7, wherein the frame configuration information is configured by assuming a special subframe as a DL subframe when the number of DL subframes is divided by the number of UL subframes.

* * * * *